United States Patent
Thomas et al.

[19]

[11] Patent Number: 6,065,239
[45] Date of Patent: May 23, 2000

[54] TWIST CLOSURE DROP FISHING NET

[76] Inventors: Kent R. Thomas, 2699 E. 28$^{th}$, Suite 402, Signal Hill, Calif. 90806; Kurt Swanson, 7906 NE. Day Rd. West, Bainbridge Island, Wash. 98110

[21] Appl. No.: 09/406,340

[22] Filed: Sep. 27, 1999

[51] Int. Cl.$^7$ .......................... A01K 71/00; A01K 74/00; A01K 79/00
[52] U.S. Cl. ................. 43/4.5; 43/7; 43/8; 43/14
[58] Field of Search ................. 43/4.5, 7, 8, 14

[56] References Cited

U.S. PATENT DOCUMENTS

| | | | |
|---|---|---|---|
| 1,152,038 | 8/1915 | Morse | 43/7 |
| 2,723,481 | 11/1955 | Schwartz | 43/7 |
| 2,728,164 | 12/1955 | Mears | 43/7 |
| 4,986,021 | 1/1991 | Thomas . | |

FOREIGN PATENT DOCUMENTS

| | | | |
|---|---|---|---|
| 508808 | 10/1992 | European Pat. Off. | 43/7 |
| 106087 | 4/1965 | Norway | 43/7 |

*Primary Examiner*—Jack W. Lavinder
*Attorney, Agent, or Firm*—Charles H. Thomas

[57] ABSTRACT

An automatically closing drop fishing net is provided for commercial fishing operations. The drop net assembly includes an upper float ring, a lower weight ring, and a net formed in a generally tubular configuration. The upper end of the net is attached to the float ring and the lower end of the net is attached to the weight ring. The drop net assembly has several torque lines that extend from locations on the float ring on the outside of the net to locations on the weight ring that are initially angularly offset at least one hundred eighty degrees relative to their points of attachment to the float ring. The torque lines are shorter than the vertical length that the net would assume in a stretched condition with the float ring buoyed upon the surface of a body of sea water and with the weight ring suspended therebeneath and held only by the structure of the net. As gravity pulls the weight ring downwardly from the float ring in the water, tension is exerted on the torque lines. This tension causes the weight ring to rotate relative to the float ring above it. The twisting of the weight ring also twists the net, thereby closing the lower portion of the net and changing its shape from a generally cylindrical configuration to a configuration of an upper inverted cone and a lower, upright cone. Fish are entrapped within the upper, inverted conical portion of the drop net assembly once it has been deployed.

20 Claims, 10 Drawing Sheets

TWIST CLOSURE DROP FISHING NET

BACKGROUND OF THE INVENTION

1. Field of the Invention

The present invention relates to a fishing net for use in capturing fish concentrated in an area near the surface of a body of water.

2. Description of the Prior Art

In conventional commercial fishing techniques, it has traditionally been a practice for fishing personnel aboard a commercial fishing boat to capture a school of fish in an ocean utilizing a purse net, sometimes called a seine fishing net. A purse seine fishing net is a net shaped generally in the form of a mesh curtain having a rope or line extending along the top edge and provided with spaced floats, such as corks. This upper line is commonly known as the "cork line". The bottom edge of the seine fishing net is weighted so that it extends vertically downwardly from the surface of the water to stretch the seine net to its maximum vertical length. A purse line is also located along the bottom edge of the net. The lower portion of the netting is known as the pursing apron.

In the use of a conventional seine pursing net, a school of fish is first located in the ocean and an ocean fishing vessel motors to the location of a school of fish. A motor boat is deployed to encircle the school of fish while continuously dropping portions of the seine fishing net overboard. The motor boat returns to its original starting location to establish proximate contact with a skiff that has remained at the initial end of the seine net. Upon establishing such contact, the seine net forms a generally cylindrical mesh curtain. A net functioning as a "sack", at the lower end of the netting is utilized to gather together the captured school of fish. The fish are removed from the sack and transferred into the hold of the motor boat.

The foregoing traditional activity involves a considerable expenditure of labor and time-consuming maneuvers about and within the school of fish. In some cases, many of the fish escape prior to sacking. Also, considerable time is expended from the initial sighting of the fish until deployment of seine purse net. In addition, during the sacking process, the purse seine net is collapsed. This results in the killing of certain species of fish that would otherwise be released and the death of entrapped sea mammals, such as porpoises, as well.

As an advance in the art an alternative solution was devised to produce a noncollapsible deep sea fishing net which is deployed by helicopter. This system is described in U.S. Pat. No. 4,986,021, which is incorporated herein by reference in its entirety.

According to the '021 patent, a fishing net is constructed generally in the shape of a cylinder having an open top and, initially, an open bottom. A buoyant float ring is connected to the generally circular top edge of the net while a weighted ring is connected approximately two-thirds of the way down the vertical length of the net, thus leaving a weighted skirt extending therebeneath. A draw line provided around the lower edge of the skirt is weighted with a closure weight. The closure weight is connected to the draw line, but is initially suspended from above by a cable from a helicopter hovering overhead. Once the net has been deployed in the water and the weight ring has sunk to the desired depth, the school of fish is laterally encircled beneath the surface of the water by the cylindrical net suspended from the buoyant float ring. Personnel in the helicopter then release the closure weight, which thus pulls on the draw line and closes the bottom of the skirt so that the fish cannot dive beneath the lower edge of the net and escape.

The device of the '021 patent has significant advantages over conventional seine purse fishing nets. It can be deployed rapidly by helicopter and positioned so as to laterally encircle a school of fish before the fish can escape. Once the bottom of the skirt has been closed, the fish are entrapped within the lateral confines of the net, and cannot escape through the bottom of the net, since the skirt has been closed. Moreover, both the float ring and the weight ring retain their original geometric shape, thus preventing the net from collapsing. As a consequence, although the fish are entrapped within the net, they are not likely to be killed since the net retains its shape and in effect forms a floating cage or aquarium. This allows the fishing vessel sufficient time to reach the site of capture whereupon the fishing vessel personnel use a crane to slowly raise the drop net.

As the drop net is raised, the fish swim to the surface and through a special "chute" into another holding net attached to the ship. Unwanted and protected species are returned to the sea. Because the netted fish are alive, they are suitable for aquarium use, sea farming, tag and release, and other manner of uses that require live, uninjured delivery. Moreover, because the drop net of the '021 patent can be deployed by helicopter, it can be dropped from above upon a concentration of a school of fish which often feed close together at the surface of the sea in a frenzied condition. A school of fish engaged in such frenzied feeding produce a recognizable water condition known in the fishing industry as "foaming" or "boiling" which can be visually spotted from the air a considerable distance away.

One significant problem with the drop net disclosed in the '021 patent which has persisted, however, is the closure or pursing arrangement. It is extremely difficult for personnel aboard a helicopter to properly control the closure weight at a correct time that will maximize capture of the fish. In deploying the drop net, all too often the closure weight is dropped either too early or too late. When the weight is dropped too early, the skirt of the net is closed above a major portion of the school of fish, thus allowing those fish to escape. Conversely, if the closure weight is dropped too late, a large portion of the school of fish escape from the lateral confines of the net merely by diving beneath the lower edge of the skirt and swimming away before the skirt can be closed. Thus, while the drop net of the '021 patent does represent a significant theoretical advance in the fishing industry, the difficulty in closing or pursing the net has remained an unsolved practical problem that has persisted for a number of years.

SUMMARY OF THE INVENTION

The present invention represents an improvement to the drop fishing net described in U.S. Pat. No. 4,986,021. Unlike the drop net disclosed in that patent, the net of the present invention has a lower edge which is closed automatically at just the right time. More specifically, the lower portion of the drop net of the invention closes automatically when the weight ring of the invention sinks to a sufficient depth beneath the float ring.

In use, the improved drop net assembly of the invention is first collapsed so that the net is folded in accordion fashion beneath the float ring above and the weight ring beneath. The drop net assembly is transported by helicopter to a concentrated school of fish which often feed together in large numbers near the surface of the sea. The drop net assembly is lowered by the helicopter so that the float ring and weight ring are centered upon the largest mass of the body of the feeding fish. The drop net assembly is released, thus allowing the weight ring to descend downwardly from the float ring. There are three torque lines that have upper ends attached at one hundred twenty degree intervals around the periphery of the float ring. The lower end of each torque line is attached to a location on the weight ring angularly offset at least one hundred eighty degrees from the location of attachment of its upper end to the float ring above.

As a consequence, when the net is dropped and the weight ring descends downwardly from the float ring, the tension on the torque lines that is created as the weight ring falls away from the float ring causes the weight ring to rotate. The tangential component of force exerted by the torque lines on the weight ring rotates the weight ring until the torque lines are in a generally vertical alignment extending downwardly from the float ring. As a result, the generally cylindrical shape of the net enclosure is changed to the shape of two cones having a common apex in the lower portion of the net. The bottom of the upper, inverted conical portion of the net is closed off at its submerged apex so that the fish cannot escape.

The improved drop net of the invention provides a remarkably improved system for closing the bottom of a fishing net on the high seas. Closure of the net is in no way dependent upon the actions of personnel aboard the helicopter deploying the net once the net has been dropped. To the contrary, the descent of the weight ring that is attached to the lower edge of the net automatically effectuates closure of the bottom of the net as it approaches its maximum unfolded length beneath the surface of the water.

The key to the successful automatic closure of the drop net of the invention is the provision of the plurality of torque lines that are connected between the float ring that remains floating atop the surface of the water and the weight ring which descends beneath the surface of the water. The float ring is connected to the upper edge of the laterally encompassing net, while the weight ring is connected to the lower edge of the net. The torque lines cause the weight ring to rotate in a generally horizontal plane about a generally vertical axis as it descends beneath the surface of the water more or less directly beneath the float ring which is also oriented in a generally horizontal plane at the surface of the water.

The torque lines have upper and lower ends. The upper ends of the torque lines are connected to the buoyant float ring at spaced locations about the circumference of the float ring. The lower ends of the torque lines are also connected to the weight ring at spaced locations about its circumference, but the points of connection of the lower ends of the torque lines are angularly offset from the points of connection of the upper ends of the torque lines to the float ring. For maximum advantage the points of connection of each torque line to the buoyant, floating ring are angularly offset at least one hundred eighty degrees relative to their points of connection to the weight ring. Also, the torque lines must have a length that is shorter than the distance between the locations of connection of its ends to the float ring and to the weight ring when the net is extended to its maximum vertical length.

As a consequence, as the weight ring approaches its maximum depth as permitted by the vertical length of the net which is attached to both the buoyant float ring and to the weight ring, the torque lines are placed under tension. However, rather than halting the descent of the weight ring as the ring approaches its maximum depth, still in its initial angular orientation relative to the buoyant float ring, the tension in the torque lines causes the weight ring to rotate relative to the float ring located thereabove, thereby bringing the torque lines into generally vertical alignment extending downwardly from the buoyant float ring. This rotation of the weight ring at the bottom edge of the net causes the net to twist at a level located vertically between the weight ring and the float ring. Thus, the lower portion of the net is literally twisted shut, thereby preventing fish from escaping under the lower edge of the net. The greater the vertical length of the net and the greater the specific gravity of the netting, the deeper will be the point at which a twist is formed in the net.

The twisting closure of the net beneath the surface of the water is achieved without any human coordination or intervention once the net has been released. The depth at which the lower portion of the net is closed, the speed with which it is closed, and the interval between dropping the net from the helicopter and closure of the lower portion of the net to prevent the escape of fish from beneath the bottom edge of the net are all governed by the structural materials and configuration of the drop net of the invention.

A preferred feature of the invention involves the use of running lines spaced periodically about the circumference of the drop net. The running lines extend from the weight ring through loops or sleeves located on the inside of the net and through grommets that define eyes on the float ring. From the float ring the running lines converge toward the central axis of the drop net where they are all coupled to a lift ring.

The confining drop net apparatus of the invention, when initially assembled for use but prior to being picked up by a helicopter, is collapsed into a generally toroidal or donut-shaped configuration. In this collapsed condition the float ring resides atop the collapsed net which is folded in accordion-like fashion therebeneath. The net rests atop the weight ring. Since the float ring, the net, and the weight ring are all vertically collapsed together, most of the length of the running lines is exposed. Preferably a number of sacrificial ties are passed about the stacked float ring, net, and weight ring to aid in holding the drop net assembly in its collapsed, toroidal condition during transport.

A helicopter is the best means for transporting the drop net of the invention to a school of fish. Once aloft, a helicopter hovers over the collapsed fish-confining device and lifts it from the deck of the parent fishing vessel using a hook on the end of a cable that lifts the drop net device by the lift ring. The helicopter then flies with the drop net device suspended beneath it until it is directly above a school of fish located near the surface of the water.

The drop net of the invention is then lowered while still in its collapsed condition, with the school of fish centered within the lateral enclosure of the float ring. If the fish are engaged in a feeding frenzy, they will normally not be frightened, but will continue to engage in their frenzied, feeding activity. The successful deployment of the confining apparatus of the invention is aided in this regard, since the running lines are completely played out, thus increasing the altitude from which the helicopter can lower the confining drop net apparatus. The noise and air wash from the helicopter is thus at a considerable distance above the surface of the water, so that the fish are not frightened and do not swim away.

Once the float ring reaches the surface of the water, the helicopter personnel release the hook holding the lift ring, thus removing all upward tension on the running lines. The weight ring is heavy enough to snap the sacrificial ties once the upward pull on the running lines has been removed, thereby allowing the weight ring to rapidly descend vertically downwardly beneath the surface of the water. As the weight ring descends, the running lines are pulled freely through the eyes and grommets on the float ring. As the weight ring descends, it carries the lower edge of the net downwardly, thus defining a laterally encompassing enclosure having the general shape of a cylinder.

As the weight ring approaches the limit of its descent, which is determined by the vertical length of the net in a somewhat stretched condition due to the force of gravity in water on the weight ring, the torque lines begin to exert forces on the weight ring. More specifically, as the weight ring approaches the lower limit of its descent, the torque lines are placed under tension before the tension on the net from above halts the downward movement of the weight ring. This occurs because the ends of the torque lines are secured to locations on the float ring and on the weight ring that are initially angularly offset from each other by at least one hundred eighty degrees.

Because the torque lines are substantially inextensible, particularly as contrasted with the mesh of the net, they exert a significant tangential force on the weight ring before the weight ring is limited in its downward movement by the tension from above exerted by the net. This force acts to rotate the weight ring from its initial position relative to the float ring through an arc approaching or reaching one hundred eighty degrees. At this point the torque lines are reoriented from a spiral alignment stretched across the outside surface of the net between approximately diametrically opposed locations on the float ring and on the weight ring, to a vertical, linear alignment, since the weight ring has by this time been rotated approximately one hundred eighty degrees from its initial orientation relative to the float ring.

The rotation of the weight ring has a very marked effect upon the geometric shape of the net. That is, it causes the shape of the net to change from a generally cylindrical configuration to a configuration defined by a pair of coaxial cones having a common apex. The uppermost cone is pointed downwardly, and the lowermost cone is pointed upwardly and both are aligned on the save vertical axis. The lower portion of the net is thereby closed at the common apex of the two oppositely directed conical portions of the net. All fish that are in the uppermost conical enclosure are thereby entrapped and cannot escape from the upper conical portion of the net. The base of the upper conical-shaped portion of the net is held at the level of the surface of the water by the buoyancy of the float ring. The apex of the lower extremity of the upper conical portion of the net is closed by the one hundred eighty degree twist given to the base of the lower cone by the rotation of the weight ring.

Once the fish have been removed from the upper, inverted conical portion of the net, the confining device can be retrieved by the helicopter. Specifically, the helicopter personnel lower a cable bearing a hook which is used to retrieve the lift ring. By pulling upwardly on the lift ring, the vertical upward force exerted by the helicopter again exerts tension on the running lines. The upward force on the running lines causes the weight ring to counterrotate, thus returning the net to a generally cylindrical shape or the shape in the form of a polygonal prism. Continued upward force is exerted on the running lines as the helicopter rises and pulls the weight ring up toward the float ring, thereby again collapsing the fishing net therebetween. Further upward force on the running lines lifts the confining drop net apparatus from the water so that the helicopter can transport it by air and either deposit it at a new location in the water to entrap another school of fish, or return it to the fishing vessel.

The improved, self-closing drop fishing net of the invention has very significant advantages for use in the commercial fishing industry. The device is extremely simple yet unique in both construction and operation. Furthermore, by employing a system to automatically rotate the lower portion of a laterally enclosing net to twist shut the bottom opening therein, the invention eliminates the need for jibs or auxiliary weights on the bottom of the net, such as those required in U.S. Pat. No. 4,986,021. This allows all of the weight necessary to carry the lower edge of the net downwardly to be concentrated in the weight ring. This feature has the added advantage of providing greater rigidity to the weight ring simply because of the increased weight that can be used in the weight ring. Also, there is an excellent control of the shape of the net as it drops through the water, since the very bottom of the net is shaped by the weight ring itself.

A further advantage of the invention is that due to its very simple construction in which the use of a purse apron, a purse line, and a closure weight are eliminated, the vertical height of the net can be increased without adding to the overall weight of the device. It is highly desirable for the weight of a drop net for ocean fishing to be kept to less than one thousand pounds, as transportation of a net having a weight greater than one thousand pounds suspended beneath a helicopter becomes difficult, particularly where high winds are present.

In one broad aspect the present invention may be considered to be an apparatus for entrapping fish comprising upper and lower hoops, a laterally enclosing net, and a plurality of torque lines. The upper hoop is a structure that floats on the surface of a body of water and which defines a closed buoyant float ring having a circumferential length and a fixed circumferential shape. The lower hoop is a structure that sinks in the water and which defines a closed, weighted ring having a circumferential length and a fixed circumferential shape. The laterally enclosing net has an upper end with a closed circumference, a lower end with a closed circumference, and a longitudinal length equal to the distance between the net ends when they are drawn a maximum distance apart. The upper end of the net is secured about its circumference to the outer hoop throughout its circumference. The lower end of the net is secured about its circumference to the lower hoop about its circumference. The torque lines have opposing upper and lower ends that are secured at fixed, angularly offset locations to the upper and lower hoops, respectively. The torque lines have a linear length less than the longitudinal length of the laterally enclosing net. In this way the torque lines rotate the lower hoop and twist the lower portion of the net shut when the lower hoop descends from the upper hoop in the body of water.

In another broad aspect the invention may be considered to be an apparatus for trapping fish in water comprising: a float ring that is buoyed to float upon the surface of water, a weight ring that sinks when dropped in water, a net having a mesh size small enough to prevent the passage therethrough of fish having a predetermined size, and a plurality of torque lines. The net has an upper end secured to said float ring throughout its circumference and a lower end secured to said weight ring throughout is circumference. The net has a predetermined length that is a design depth vertical distance of separation in water between the float ring and the weight ring. The torque lines have opposite ends anchored to the float ring and to the weight ring at locations thereon angularly offset from each other. In this way the anchored ends of each of the torque lines lie at a torque anchor end spiral distance of separation as measured on the outside surface of the net in its cylindrical condition that is greater than the design depth vertical distance of separation between the float ring and the weight ring. The length of the torque lines is less than the torque anchor end spiral distance of separation. As a result, the torque lines cause the weight ring to rotate relative to the float ring as the weight ring travels toward the design depth vertical distance of separation between the float ring and the weight ring, thereby twisting and closing the bottom portion of the net.

In still another broad aspect the invention may be considered to be a method of entrapping fish in a body of water utilizing a confining apparatus having a buoyant upper hoop of fixed shape, a weighted lower hoop of fixed shape, a laterally encompassing net having an upper end secured to the upper hoop throughout its circumference and a lower end secured to the lower hoop throughout its circumference, and a plurality of torque lines each having opposing ends connected to the upper and lower hoops at fixed, angularly offset locations thereon. According to the method of the invention, the confining apparatus is released from the air onto a body of water above a school of fish. Consequently, the weighted hoop sinks beneath the surface of the body of water to extend the net while the buoyant hoop floats thereabove. The method also requires the lower hoop to be caused to rotate relative to the upper hoop thereby twisting the lower portion of the net shut.

The invention may be explained with greater clarity and particularity with reference to the accompanying drawings.

DESCRIPTION OF THE EMBODIMENT AND IMPLEMENTATION OF THE METHOD

Figure 1:
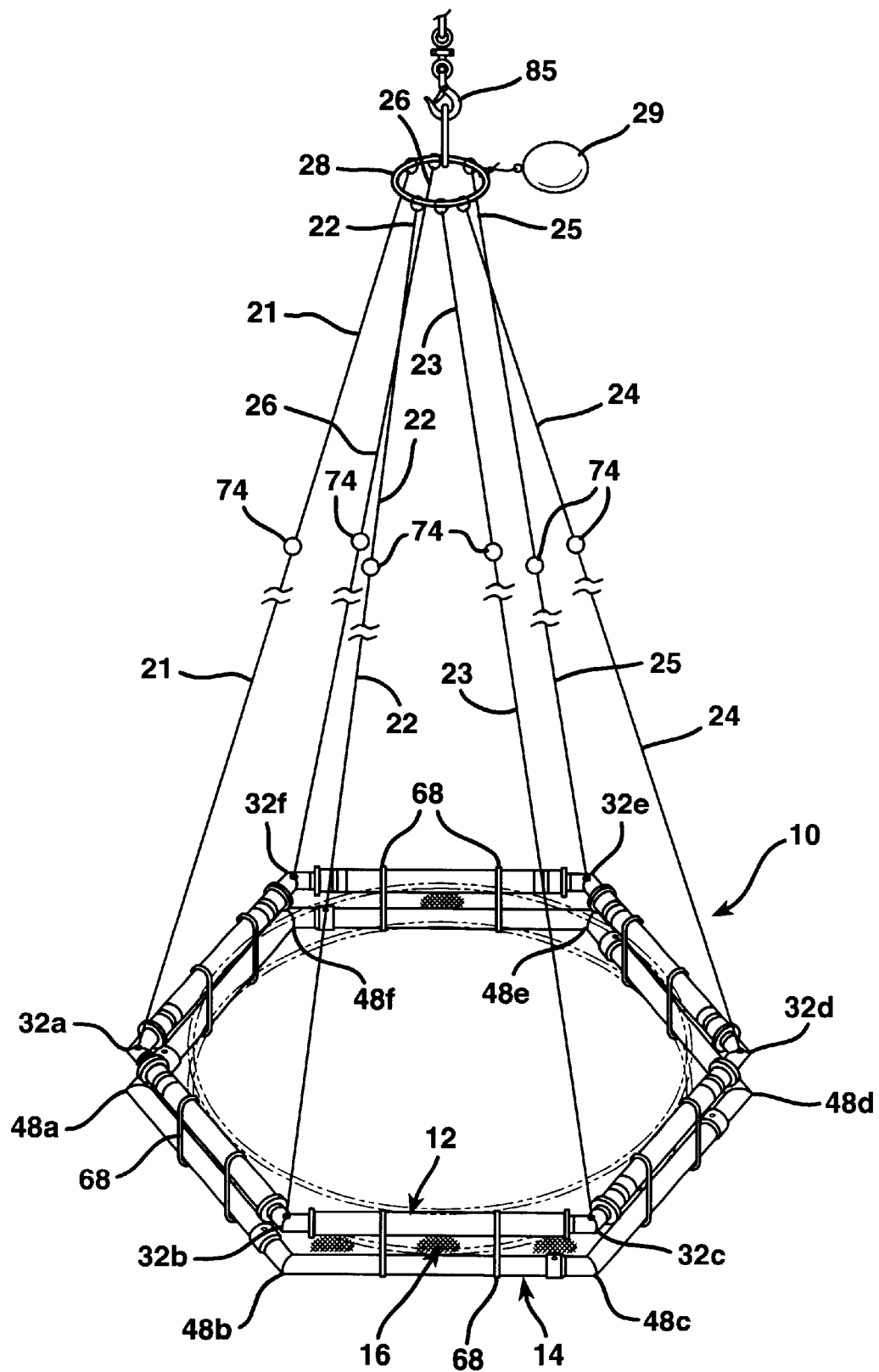
FIG. 1 is a perspective view of one preferred embodiment of a fish-capturing drop net apparatus according to the invention in the condition in which it is lifted from the deck of a fishing vessel for placement in the water above a school of fish.
Figure 2:
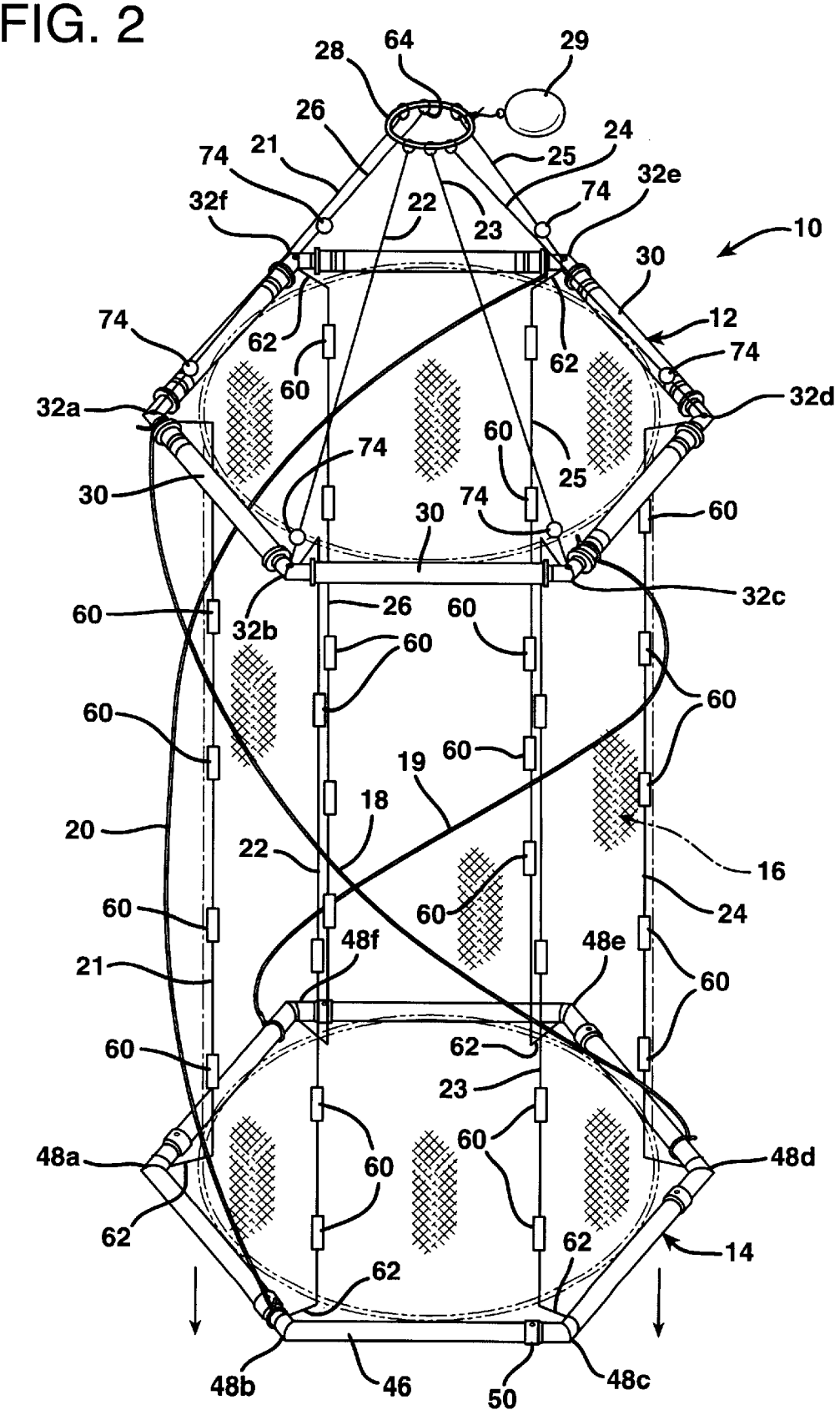
FIG. 2 is a perspective view showing the drop net apparatus of FIG. 1 at an intermediate stage of deployment following release from above.
Figure 3:
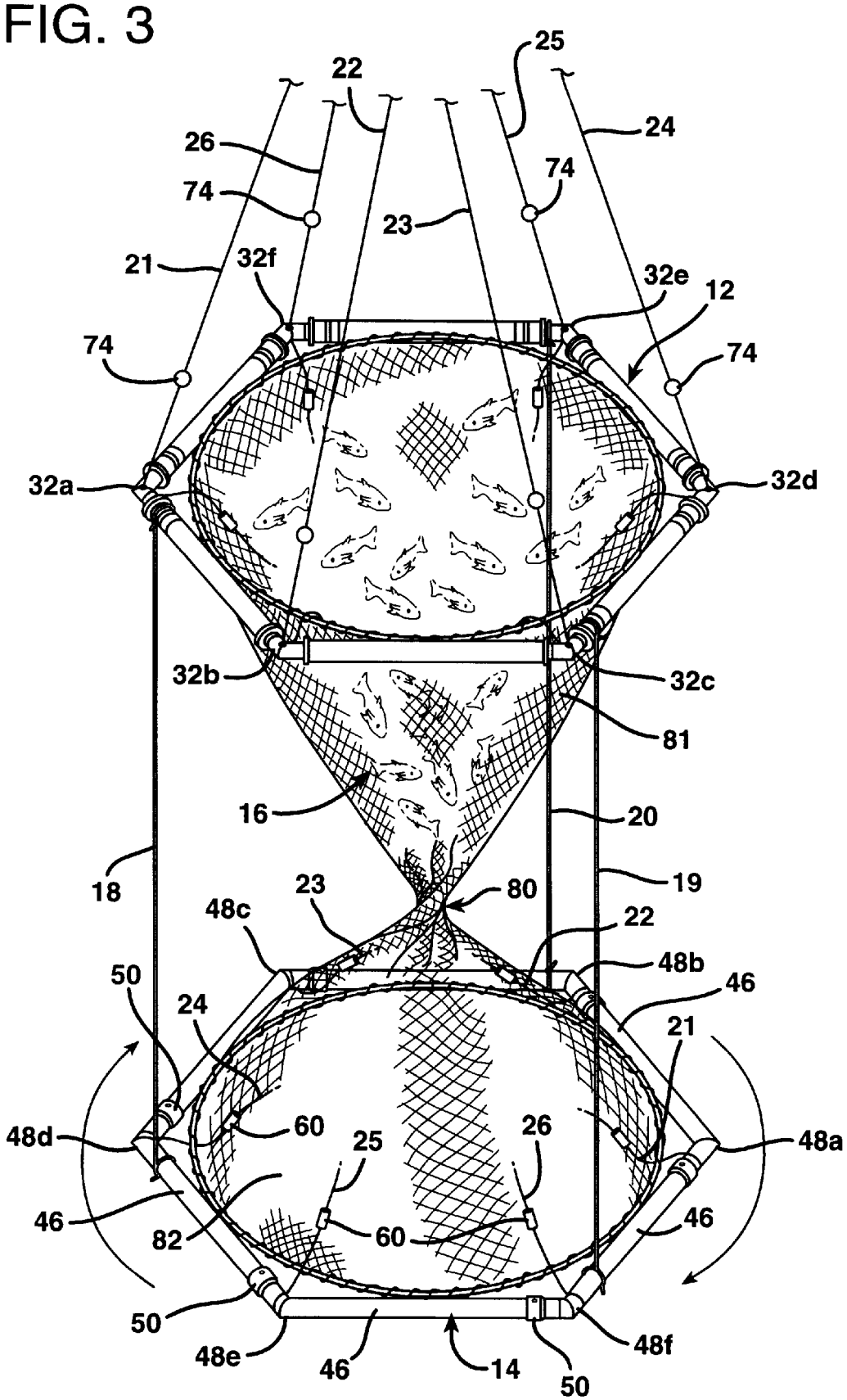
FIG. 3 is a perspective view of the drop net apparatus of FIG. 1 illustrating the automatic closure of the bottom opening of the fish net thereof.

FIGS. 1–3 illustrate a drop net apparatus 10 for entrapping fish which are indicated at 79 in FIG. 3. The component elements of the fish-trapping drop net apparatus 10 are best illustrated in FIGS. 2 and 3.

The fish-trapping apparatus 10 is comprised of an upper hoop or float ring 12; a lower hoop or weight ring 14; a laterally enclosing net indicated generally at 16; a plurality of torque lines 18, 19, and 20; six running lines 21–26; and a lift ring 28, all of which are illustrated in FIG. 2. Preferably, there are at least three torque lines.

Both the upper float ring 12 and the lower weight ring 14 may be formed in any closed, geometric configuration. The simplest configuration for both the float ring 12 and the weight ring 14 would be a circular one. However, to facilitate storage of the component parts of the float ring 12 and the weight ring 14, a polygonal configuration is preferred. In the embodiment illustrated, both the float ring 12 and the weight ring 14 have a hexagonal shape and are equal in circumference.

The float ring 12 is constructed with a plurality of elongated sections of high-density polyethylene float ring pipe 30 having internal charged air cylinders with quick disconnect fittings. Each of the pipe sections 30 is constructed of nominal six-inch diameter 17-SDR PE having a length of 19.16667 feet and a weight per foot of 3.29 pounds. The float ring 12 also includes six elbows 32, each of which has legs 34 of equal length and oriented relative to each other at an angle of one hundred twenty degrees. The elbows 32 define six corners 32a, 32b, 32c, 32d, 32e, and 32f on the float ring 12. The legs 34 of each elbow 32 fit telescopically within the ends of the polyethylene pipe sections 30, as best illustrated in the detail plan view of FIG. 8. Each of the elbows 32 is formed of aluminum and has a linear weight of 4.9 pounds per foot. Each of the elbow legs 34 is provided with a radially outwardly projecting, annular abutment stop 36 that provides a shoulder to limit the extent to which the elbow legs 34 can be inserted into the ends of the polyethylene pipe sections 30.

Diametrically aligned holes are defined through the walls near the ends of the polyethylene pipe sections 30 and through the walls of the legs 34 of the elbows 32 to receive nylon pins 38. In the assembly of the float ring 12, the nylon pins 38 extend through the walls of the pipe sections 30 and the elbow legs 34 and are covered with thin rubber sleeves 40, shown in phantom in FIG. 8. The sleeves 40 hold the nylon pins 38 in position. Wider rubber sleeves 42 cover the intersections between the polyethylene float rings pipe sections 30 and the elbows 32 to prevent damage to the net 16, and are also illustrated in phantom in FIG. 8.

At the intersection of the legs 34 diametrically aligned openings or eyes are defined through the walls of each elbow 32 and grommets 44 are secured in each of these aligned openings. The grommets 44 permit the free passage of the running lines 21–26, as will hereinafter be described.

Each elbow 34 has a dry weight of 7.83 pounds and a wet or immersed weight of 4.78 pounds. The elbows 34 have an aggregate dry weight of 47.01 pounds. The float ring 12 has a total weight of four hundred fifty-three pounds and a total net buoyancy of 1281 pounds.

The weight ring 14 is formed of two-inch diameter tubular steel pipe sections 46. Each of the sections 46 has a dog leg configuration with a corner formed at an angle of one hundred twenty degrees therein. Each weight ring section 46 has male and female tapered ends. The male end of each of the steel pipe sections 46 fits into the female end of the next adjacent pipe section 46. Each of the ends of each pipe section 46 is drilled with diametrically aligned openings that receive steel bolts that fasten the telescopically engaged adjacent ends of the steel weight ring pipe sections 46 together. The steel fastening bolts for the weight ring 14 are covered with rubber sleeves 50 which are visible in FIGS. 2 and 3. The angled legs of all of the pipe sections 46 form corners 48a, 48b, 48c, 48d, 48e, and 48f. When the steel pipe sections 46 are assembled together, they create a weight ring 14 having a hexagonal configuration. The total weight of the weight ring 14 is three hundred twenty-six pounds.

The weight ring 14 and the float ring 12 both have the same circumferential length, as measured along their center lines. In the embodiment illustrated in the drawings the circumferential length of both the weight ring 14 and the float ring 12 is about one hundred twenty feet. Both the float ring 12 and the weight ring 14 have a fixed, hexagonal, circumferential shape. The shape is fixed in the sense that when assembled, the sides of the float ring 12 and the weight ring 14 do not collapse inelastically although they do flex resiliently to a certain extent in response to forces acting upon them. The fixed shapes of the float ring 12 and the weight ring 14 serve to prevent the laterally enclosing net 16 from collapsing once it is deployed in the water as illustrated in FIGS. 2 and 3.

Figure 4:
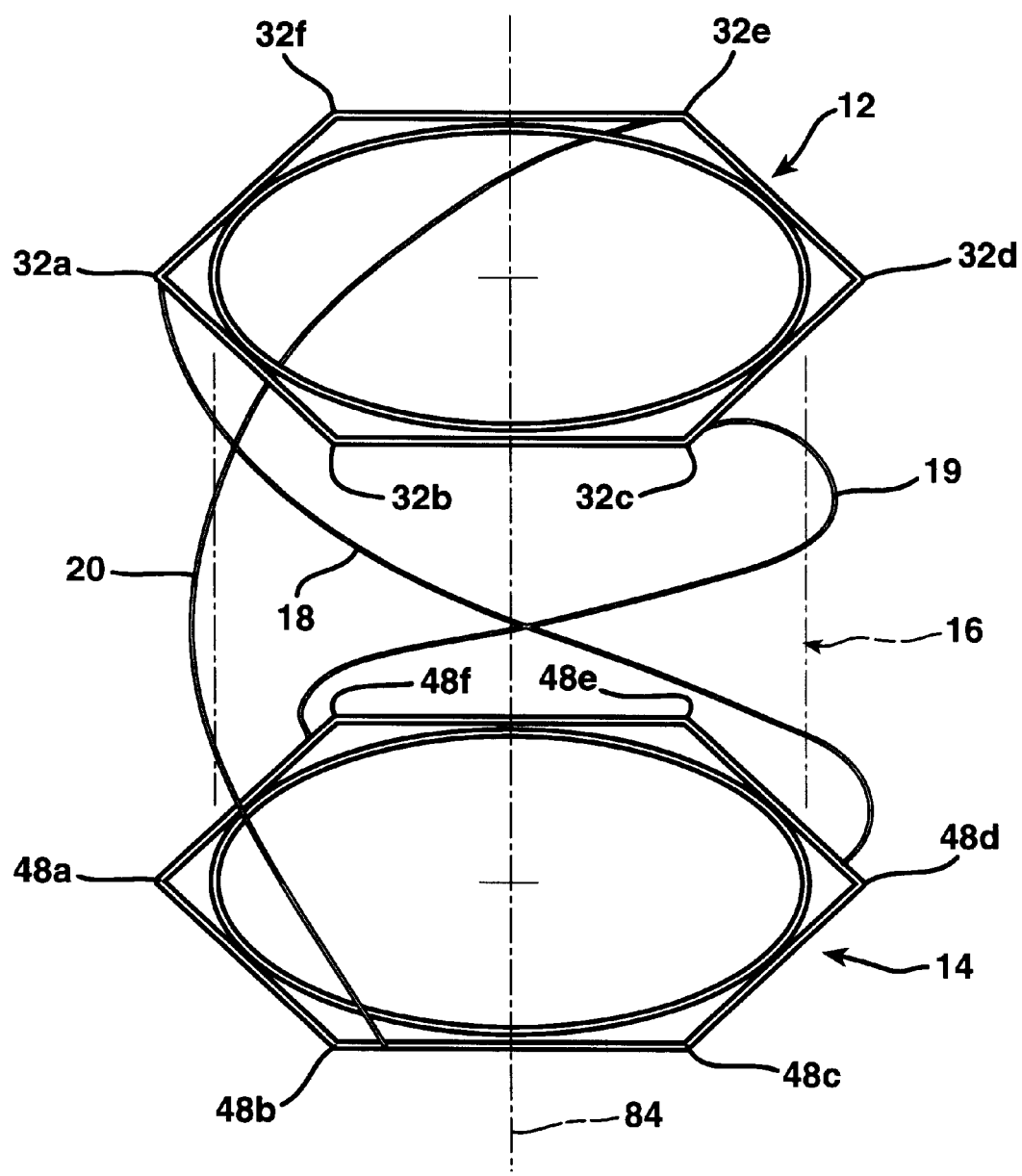
FIG. 4 is a diagrammatic perspective view illustrating the attachment and condition of the torque lines of the drop net apparatus as shown in FIG. 2.

The laterally enclosing net 16 has a closed circumference and when deployed in the water initially forms a generally cylindrical enclosure, as best depicted in FIGS. 2 and 4. The net 16 is formed of nylon line woven into a tubular structure having a mesh size that is small enough to prevent the passage therethrough of fish of a predetermined size. For example, the mesh size of the net 16 may be one inch. That is, in an unstretched condition the mesh openings of the net 16 have a square configuration and measure one inch on a side. This distance between two adjacent knots defining corners of each mesh opening is referred to as a "bar" in net terminology. The mesh openings are diagonally oriented so that a portion of the mesh of the net 16 at an intermediate vertical location between the float ring 12 and the weight ring 14, as viewed in vertical elevation, appears as illustrated in FIG. 10.

Figure 10:
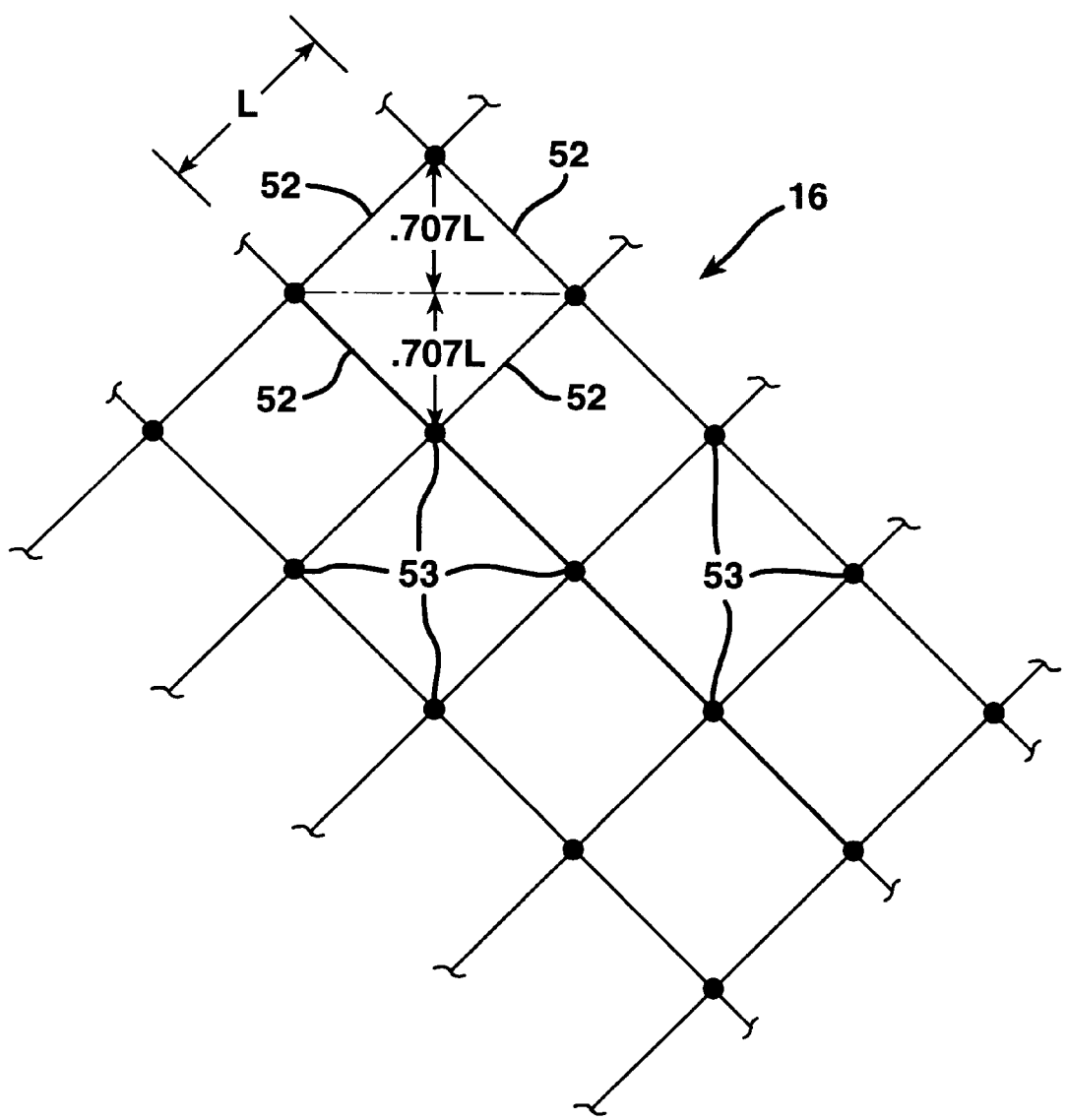
FIG. 10 is an elevational detail of an intermediate portion of the net of the invention.

As illustrated in FIG. 10, each mesh opening is defined by four bars 52, each of which has a one-inch length between conventional knots 53 indicated at L in FIG. 10. Since the meshes are diagonally oriented, as illustrated, the vertical distance from the top to the bottom of a single bar 52, when the net is in an unstretched condition, is 0.707 L. Thus, each mesh opening, when the net is in an unstretched condition, as at its design depth, each mesh opening has a vertical height of 1.414 L. However, when the net is stretched, as occurs during its deployment according to the invention, the height of each mesh opening will increase up to a maximum vertical length of 2 L.

Figure 8:
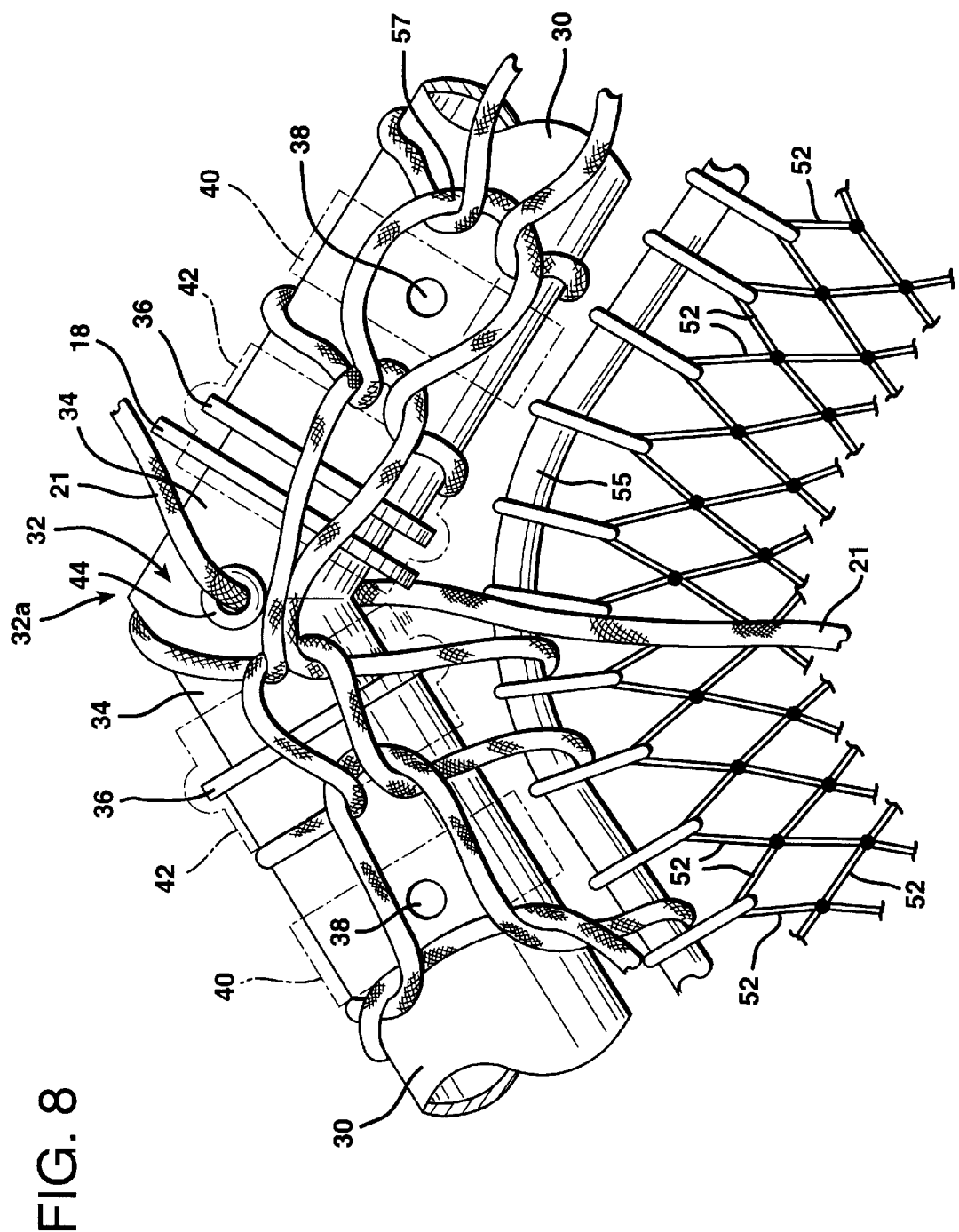
FIG. 8 is a top plan detail illustrating one of the joints in the upper hoop or float ring of the drop net apparatus of FIGS. 1–3.
Figure 9:
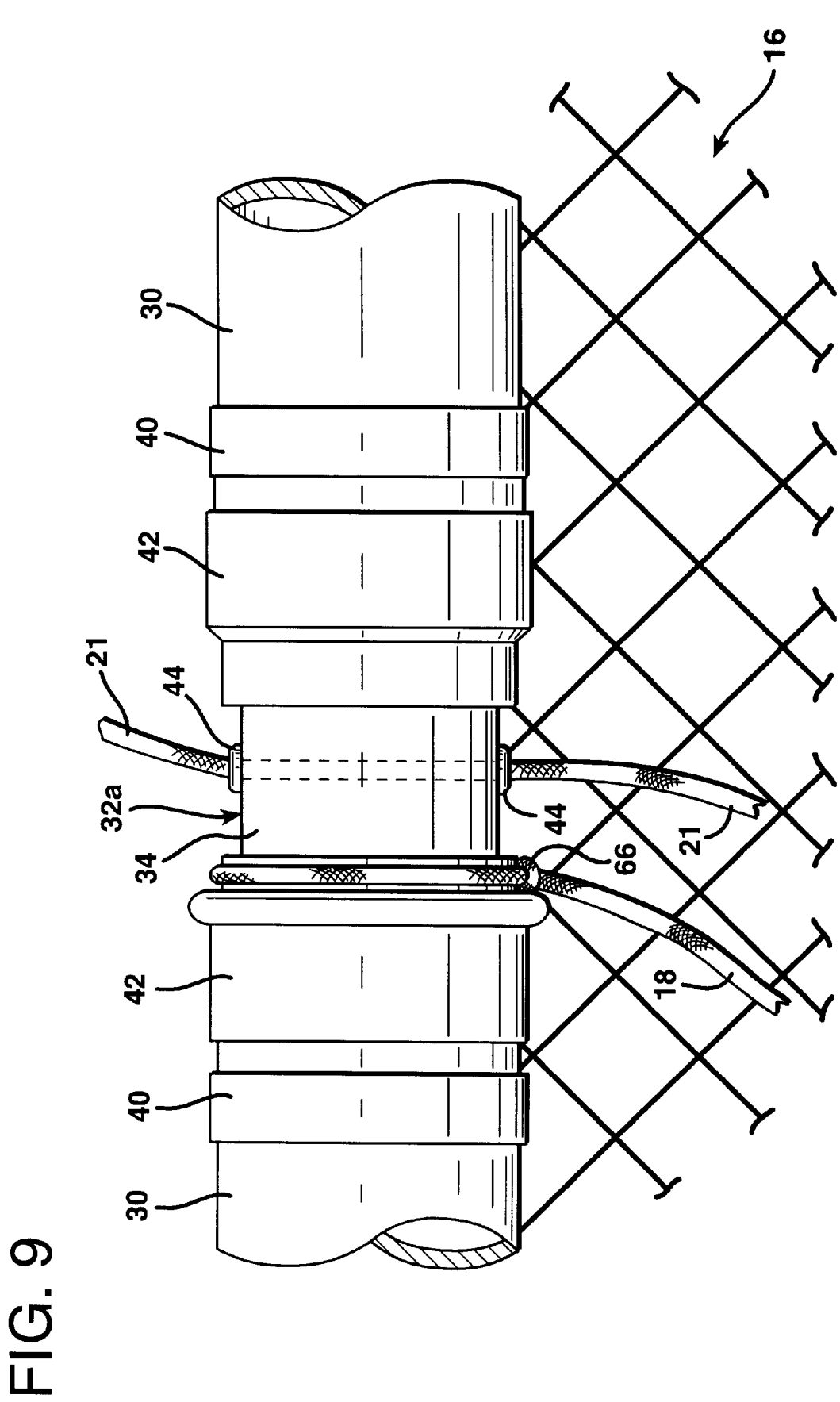
FIG. 9 is a side elevational detail from the outside of the joint of FIG. 8.

In its unstretched condition the laterally enclosing net 16 is configured to have a generally cylindrical configuration thirty-eight feet in diameter, which gives it a circumference at the top edge, as defined by the length of its head rope 55 shown in FIG. 8, of 119.38 feet. The bottom of the net 16 has the same circumference and is defined by the length of its foot rope which is located at the bottom edge of the net 16. The head rope 55 at the upper edge of the net 16 is attached to the float ring 12 with nylon line 57 using a chain stitch around the circumferences of the net head rope 55 and the pipe sections 30 and elbows 32 that form the float ring 12. Similarly, the foot rope that extends about the circumference of the net 16 at its lower edge is secured to the sections 46 of the weight ring 14 by chain stitches of nylon line.

The height or longitudinal length of the net 16 is substantially equal to the distance of vertical separation that would exist between the float ring 12 and the weight ring 14 in the absence of the torque lines 18, 19, and 20. That is, the float ring 12 has sufficient buoyancy to remain afloat when the apparatus 10 is placed in the water despite the gravitational effect on the net 16 and the weight ring 14. The net 16 may be fabricated from a material having a specific gravity of anywhere between about 0.96 up to 1.38. From a functional standpoint it is more desirable for the specific gravity of the netting material to be greater, since this will result in twisting of the net at a lower depth, thus capturing more fish above it. However, netting having a lower specific gravity is more desirable from the standpoint of transportability, since the overall weight of the device must be kept within the limits suitable for rapid transportation by helicopter. Factors such as expected depth of the bulk of a school of fish, expected distances between the parent fishing vessel and the site of deployment of the drop net apparatus 10, the model of helicopter involved, wind conditions, and other factors all play a part in determining the most appropriate specific gravity for the netting material. In practice, netting having the specific gravity of 0.96 has achieved satisfactory results and allows the fish-trapping drop net apparatus 10 to be transported considerable distances by helicopter.

The net 16 in the preferred embodiment of the invention shown has a specific gravity of 0.96, an overall weight of 106.6657 pounds and a design depth of 55.88 feet. In the absence of the torque lines 18, 19, and 20, the weight ring 14 of the preferred embodiment of the invention will drop to a depth stretching the net 16 to a length as measured between the float ring 12 and the weight ring 14 a distance of about 79 feet. There are 474.25 of the diamond-shaped mesh openings between the head rope 55 at the top of the net 16 and the foot rope at the bottom of the net 16. Since each mesh opening can have a maximum length of two bars, the maximum bar length of the net 16 is equal to 2"×474.25 ÷12=75.04 feet. This may be considered to be the longitudinal length of the net 16, which is equal to the distance between the upper and lower ends of the net when they are drawn a maximum theoretical distance apart while the upper end of the net is secured about its circumference to the float ring 12 throughout its circumference, and the lower end of the net 16 is secured about its circumference to the weight ring 14 in the absence of the torque lines 18, 19, and 20.

The net 16 has six rows of vertically aligned pockets which are actually loops or sleeves 60. The sleeves 60 are each between about six inches and eight inches in length and are secured to the inside surface of the net 16. There are eight different loops 60 in each of the six rows of loops. The six rows of loops are spaced equidistant from each other about the inner circumference of the net 16, and are aligned with the corners 32a, 32b, 32c, 32d, 32e, and 32f formed by the elbows 32 in the float ring 12 and by the corners 48a, 48b, 48c, 48d, 48e, and 48f in the weight ring 14 when the drop net assembly 10 is in the condition of FIGS. 1 and 2. The six different rows of loops 60 are provided to accommodate the six running lines 21 through 26. Only some of the loops 60 are shown in FIG. 2 and the loops 60 are not shown in the other drawing figures to reduce confusion in those illustrations of the invention.

Each of the running lines 21 through 26 is about 120 feet in length and is secured near its lower end to the foot rope of the net 16 and is permanently attached thereto. Each of the running lines 21–26 has a tail 62 that extends from the foot rope and is tied off at the closest corner 48*a*, 48*b*, 48*c*, 48*d*, 48*e*, and 48*f* of the weight ring 14 using several clove hitches and finished with a half hitch knot. The running lines 21–26 are each threaded up through all of the loops 60 on the inside of the net 16 in a separate one of the rows of the loops 60 aligned therewith. At the upper edge of the net 16 the running lines 21–26 are threaded through the eyes lined with the grommets 44 in the elbows 32 of the float ring 12.

The upper ends of each of the running lines 21–26 terminates in an eye that is attached to an associated link 64. The ends of the six running lines 21–26 are collected together at the axial center of the net 16 and are each secured by a link 64 to the lift ring 28. Each of the running lines 21–26 extends from the lift ring 28 radially outwardly to a separate one of the corners of the float ring 12. The eyes through the float ring 12 formed by the grommets 44 are located at each of the six corners 32*a*, 32*b*, 32*c*, 32*d*, 32*e*, and 32*f* of the float ring 12 and are spaced at equal intervals about the circumferential length of the float ring 12. The lift ring 28 is located within the circumference of the float ring 12.

The lift ring 28 may by fabricated as a steel ring eight inches in diameter from a one-half inch diameter steel rod with ends welded together. A brightly colored float 29 is attached to the lift ring 28. The float 29 has sufficient buoyancy to float atop the surface of the water.

The weight ring corners 48*a*, 48*b*, 48*c*, 48*d*, 48*e*, and 48*f* to which the running lines 21–26 are attached are vertically aligned with the eyes formed by the grommets 44 in the float ring 12 and with the rows of vertically aligned loops 60 on the inside of the net 16 prior to the descent of the weight ring 14 from the float ring 12. Each of the corners 48*a*, 48*b*, 48*c*, 48*d*, 48*e*, and 48*f* of the weight ring 14 forms a fixed running line anchoring location on the weight ring 14 from which a single one of the running lines 21–26 passes through separate eyes formed by the grommets 44 on the float ring 12. The float ring eyes are vertically aligned with the corresponding running line anchoring locations on the weight ring 14 while the upper and lower ends of the torque lines 18, 19, and 20 reside at angularly offset locations when the fish-trapping drop net apparatus 10 is in the condition depicted in FIG. 1 and also in the condition depicted in FIG. 2.

The torque lines 18, 19, and 20 provide the fish-trapping drop net device 10 with the self-closing feature which is the critical and unique feature of the invention. When the drop net device 10 is collapsed, as illustrated in FIG. 1, and even when the weight ring 14 has only partially completed its descent below the surface of the water, as illustrated in FIG. 2, the weight ring 14 is angularly aligned with and located directly beneath the float ring 12. That is, the corner 48*a* of the weight ring 14 is vertically aligned with the elbow corner 32*a* of the float ring 12. Similarly, the corner 48*b* of the weight ring 14 is vertically aligned with the elbow corner 32*b* of the float ring 12. The corner 48*c* is vertically aligned directly beneath the elbow corner 32*c*, while the corner 48*d* is vertically aligned beneath the elbow 32*d*. The corner 48*e* is vertically aligned with the elbow corner 32*e* and the corner 48*f* is vertically aligned directly beneath the elbow corner 32*f* when the device 10 is in the condition shown in FIG. 1 and also in the condition shown in FIG. 2.

Each of the torque lines 18, 19, and 20 has an eye 66 located at its upper end and is looped about a single elbow 32 and threaded through its eye 66 so as to form a cinch about the float ring 12 at one of the elbows 32 thereof, as illustrated in FIG. 8. Each of the three torque lines 18, 19, and 20 is attached to an alternating one of the six elbows 32. That is, the torque line 18 is attached to the elbow 32*a* while the torque line 19 is attached to the elbow 32*c*. The third torque line 20 is attached to the elbow 32*e*. The cinched upper ends of the torque lines 18, 19, and 20 are prevented from sliding off the elbows 32 to which they are attached by the abutment stops 36 against which they are pulled, as shown in FIG. 8.

The lower end of each of the torque lines 18, 19, and 20 is secured to the weight ring 14 at a location slightly beyond diametric opposition from the location at which its upper end is secured to the float ring 12 prior to rotation of the weight ring 14 relative to the float ring 12. That is, prior to the time that the weight ring 14 has rotated relative to the float ring 12, the lower end of the torque line 18 is connected five feet three inches beyond the corner 48*b* of the weight ring 14, which is diametrically opposite the elbow corner 32*a*. Similarly, the lower end of the torque line 19 is attached five feet three inches beyond the corner 48*f* of the weight ring 14, which is located diametrically opposite the elbow corner 32*c* prior to rotation of the weight ring 14 when the elbows corners 32*a*, *b*, *c*, *d*, *e*, and *f* are respectively vertically aligned with the weight ring corners 48*a*, *b*, *c*, *d*, *e*, and *f*. Likewise, the lower end of the torque line 20 is secured five feet three inches beyond the corner 48*b* of the weight ring 14, which lies diametrically opposite the elbow corner 32*e* to which the upper end of the torque line 20 is connected prior to the rotation of the weight ring 14 relative to the float ring 12.

It is extremely important for the torque lines 18, 19, and 20 to have the proper length relative to the vertical length of the net 16. More specifically, each of the torque lines 18, 19, and 20 has a linear length from its upper to its lower end that is less than the longitudinal length of the laterally enclosing net 16. In the embodiment of the drop net 10 illustrated and described, the maximum theoretical stretched longitudinal length of the net 16 is 79.04 feet. This is also termed the "bar length". Therefore, the length of each of the torque lines 18, 19, and 20 must be less than the bar length which is 79.04 feet, and preferably is seventy-two feet zero inches in length. The torque lines 18, 19, and 20 must all be of equal length.

Considered another way, the length of each of the torque lines 18, 19, and 20 must be less than the torque anchor end distance of separation. The torque anchor end distance of separation may be considered to be the linear distance of separation between the point of attachment of the lower end of each torque line 18, 19, and 20 to the weight ring 14 and the point of attachment at the elbow 32 of the float ring 12 to which each of the torque lines 18, 19, and 20 is connected when the net 16 is at its design depth. That is, the torque line distance of separation is the length of a spiral line extending between the elbow corner 32*a* of the float ring 12 and the point of connection of the torque line 18 to the weight ring 14 beyond the corner 48*d* of the weight ring 14 when the net 16 is at its design depth. The design depth may be considered to be the vertical length of the net at which the net 16 still has a cylindrical shape with a diameter equal to the common diameter of the head rope and the foot rope. This is the same as the spiral line distance between the elbow 32*c* and the point of attachment of the torque line 19 to the weight ring 14 beyond the corner 48*f*, and also the spiral line distance between the elbow 32*e* and the point of attachment of the torque line 20 beyond the corner 48*b*. All of these distances are equal to each other and all are measured with the net laid out flat or unstretched vertically and measured between the head rope and the foot rope.

In the embodiment described, both the float ring 12 and the weight ring 14 have a hexagonal shape with sides that circumscribe and are tangent to the circular head rope, which is thirty-eight feet in diameter. The vertical length of the lower edge of the net 16 at its design depth beneath the float ring 12 in the absence of any weight on it is 0.707×2×L× 474.25÷12=55.88 feet. This is the design depth. The torque anchor end distance of separation is calculated from the circumferential distance of separation of the torque line ends measured in a horizontal plane and the vertical design depth of the net. Consequently, the torque anchor end distance of separation is equal to the hypotenuse of a triangle measuring 64.91 feet on one side (π×38'÷2++5.25') and 55.88 feet on the other side, or approximately 85.65 feet. That is, the torque line anchor distance of separation is 85.56 feet. The length of the torque lines 18, 19, and 20 therefore must be less than this distance, and preferably is between about eighty percent and ninety percent of that number. Preferably, each of the torque lines 18, 19, and 20 has a linear length of about seventy-two feet even.

One end of each torque line 18, 19, and 20 is anchored to an elbow of the float ring 12, while the opposite end thereof is passed in a counterclockwise direction, as viewed from above, and is anchored five feet, three inches beyond a corner of the weight ring 14 that is located diametrically opposite the elbow to which the other upper end of the torque line is connected. The square root of the sum of (a) the square of the distance of separation measured along the head rope circumference between the float ring elbow of attachment of the upper end of the torque line and point of attachment beyond the diametrically opposed weight ring corner, plus (b) the square of the design depth of the net may be defined as the torque anchor end spiral distance of separation.

Figure 11:
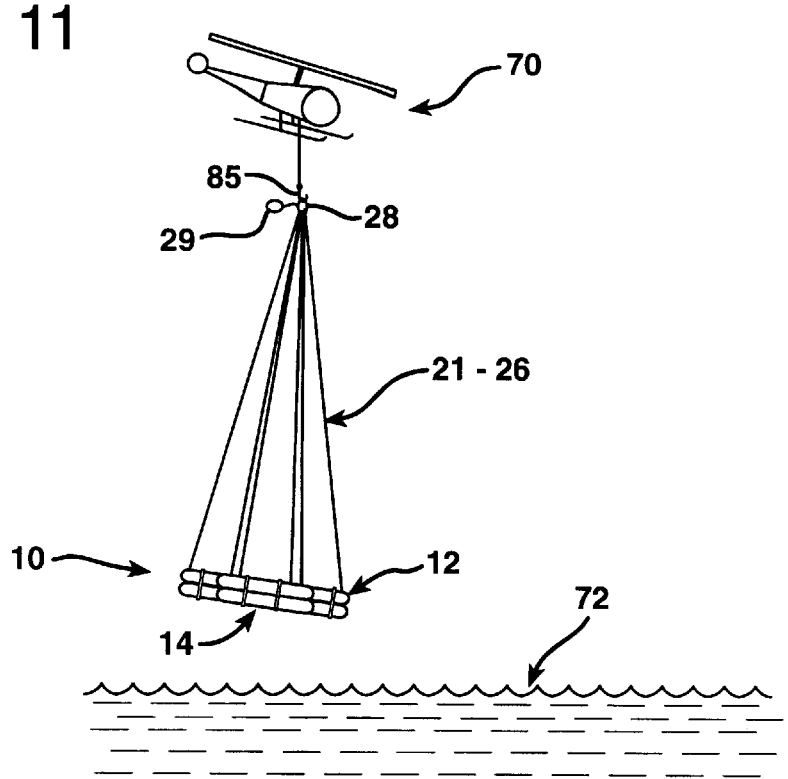
FIG. 11 is a side elevational diagram illustrating the manner of transport of the drop net of FIG. 1 toward a location for deployment and for return to a fishing vessel.

The drawing figures illustrate the drop net of the invention in various stages of deployment. FIG. 1 illustrates the drop net 10 in a condition assembled for use and ready for lifting by a helicopter. In this condition the hexagonal float ring 12 is positioned directly atop the net 16 which is folded in accordion-like fashion and which resets atop the hexagonal-shaped weight ring 14. The net 16 is completely collapsed and sandwiched in between the float ring 12 and the weight ring 14. Since the net 16 is collapsed, almost the entire length of each of the running lines 21–26 is exposed and extends to the lift ring 28. Since the running lines 21–26 are secured to the foot line of the net 16 and also to the corners 48a–48f of the weight ring 14, there is no force tending to separate the weight ring from the float ring 12 when the drop net 10 is suspended and transported by lifting from above by the lift ring 28. Consequently, it is advisable to provide sacrificial ties or bands 68 at spaced intervals about the circumference of the collapsed drop net 10 to reduce wind drag as the collapsed drop net 10 is transported through the air. Transportation of the collapsed drop net 10 is preferably by suspension from a hook 85 lowered from a helicopter 70 flying at a distance above the surface of the water 72, as illustrated in FIG. 11.

Once the helicopter 70 reaches a school of fish concentrated near the surface of the water 72, the drop net 10, still in a collapsed condition, is lowered down to the surface of the water centered upon the "foaming" or "boiling" area of the frenzied feeding of the school of fish. The hook 85 is then tripped to release the lift ring 28 once the drop net 10 reaches the surface of the water 72. This is visually apparent from sea swell and wave action on the float ring 12.

With the release of the lift ring 28, the weight ring 14 is free to descend from the float ring 12, carrying with it the lower edge of the laterally encompassing net 16. The force of gravity upon the weight ring 14 is sufficient to break the sacrificial ties 68, so that the weight ring 14 rapidly descends downwardly in the manner depicted in FIG. 2. The running lines 21–26 run freely through the grommets 44 that form the eyes through the float ring elbows 32a–32f and through the loops 60 on the inside of the net 16. Preferably, stops 74 are provided on the running lines 21–26. The stops 74 are secured to the running lines 21–26 at positions between the grommets 44 on the float ring 12 and the lifting ring 28 such that the lengths of those portions of each of the running lines 21–26 that lie between the grommets 44 on the float ring 12 and the fixed running line anchoring locations at the corners 48a–48f of the weight ring 14 is at least as great as the linear length of the torque lines 18, 19, and 20. This ensures that the weight of the weight ring 14 is borne by the torque lines 18, 19, and 20 and by the encompassing net 16, but also prevents the weight ring 14 from departing too far from a horizontal plane.

The initial deployment of the drop net 10 in the water 72 is illustrated in FIG. 2. As shown in that drawing figure, the descending weight ring 14 pulls the lower end of the net 16 down with it, thereby creating a generally cylindrical enclosed volume in the water within which the fish are laterally confined. As the weight ring 14 drops further, tension is exerted upon the torque lines 18, 19, and 20 long prior to the time that the stops 74 reach the elbows 32a–32f of the float ring 12. As a consequence, the tension on the torque lines 18, 19, and 20 acting between angularly displaced locations on the float ring 12 and the weight ring 14 cause the weight ring 14 to rotate clockwise as viewed from above, relative to the float ring 12 as the weight ring 14 descends downwardly toward a maximum distance of vertical separation between the float ring 12 and the weight ring 14.

This rotation of the weight ring 14 twists and closes the lower portion of the net 16 as illustrated in FIG. 3 until the anchored locations of the torque lines 18, 19, and 20 to the float ring 12 and the weight ring 14 are brought into straight, vertical alignment with each other, also as illustrated in FIG. 3.

Once the torque lines 18, 19, and 20 arrive at a vertical orientation, as indicated in FIGS. 3 and 11, the net 16 is divided into two portions 81 and 82. The upper portion 81 is configured generally in the shape of an inverted cone and entraps the school of fish 79 near the surface of the water 72. The lower portion 82 of the net 16 is configured generally in the shape of an upright cone. The portion 82 of the net 16 does not entrap any fish therewithin, but does create the apex of closure 80 that prevents the escape of fish 79 from the upper portion 81 of the net 16.

At this point the net 16 is closed at the location 80, so that all of the fish in the inverted conical area of the net 16 above the conical apex 80 are entrapped within the inverted conical upper portion 81 of the drop net 10. The drop net 10 thereby serves as a floating aquarium in which the fish 79 remain in a live, active, uninjured condition until the parent fishing vessel can arrive and harvest the desired species of fish 79 from the drop net 10.

Figure 5:
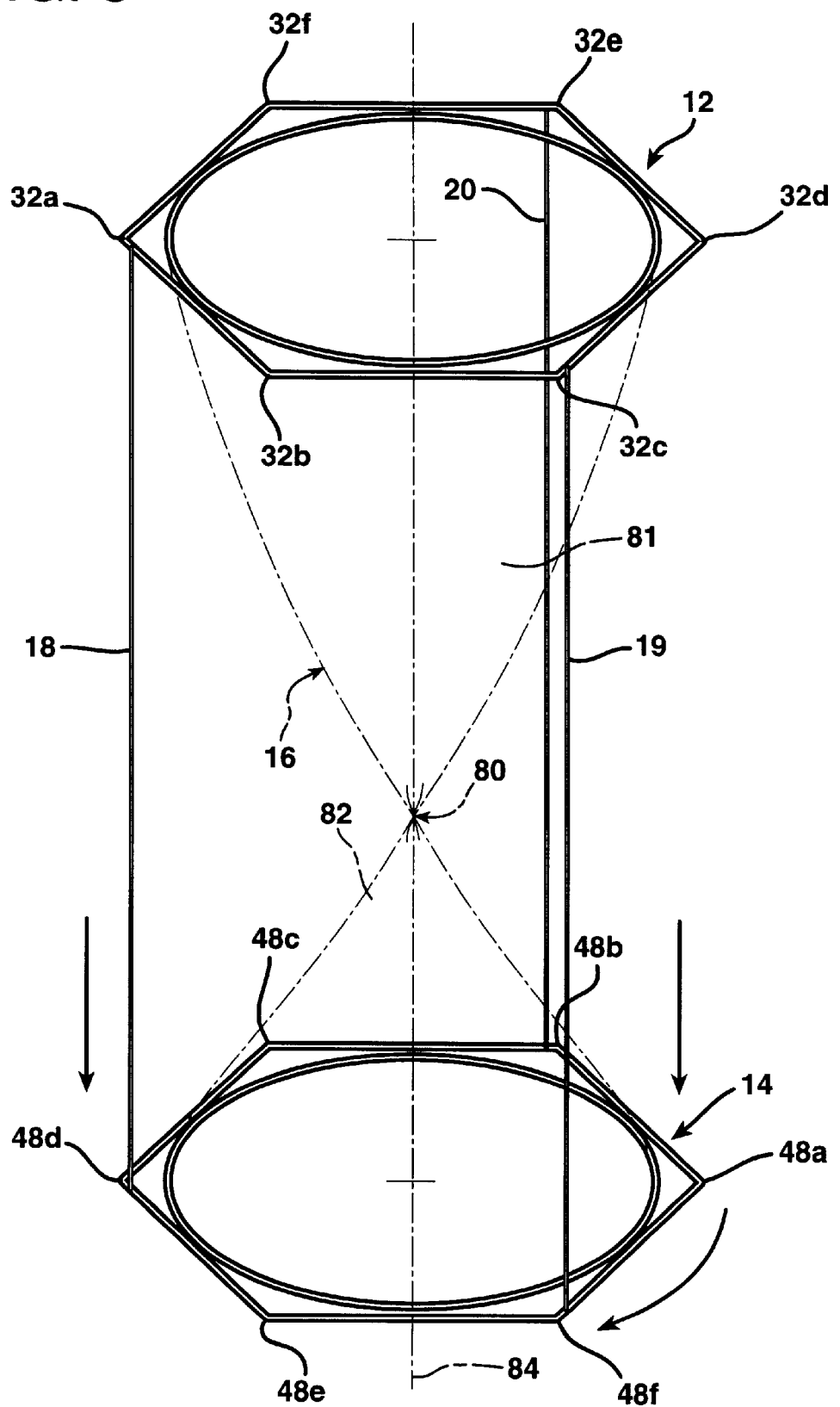
FIG. 5 is a diagrammatic perspective illustration showing the torque lines of the drop net apparatus in the condition of FIG. 3.
Figure 6:
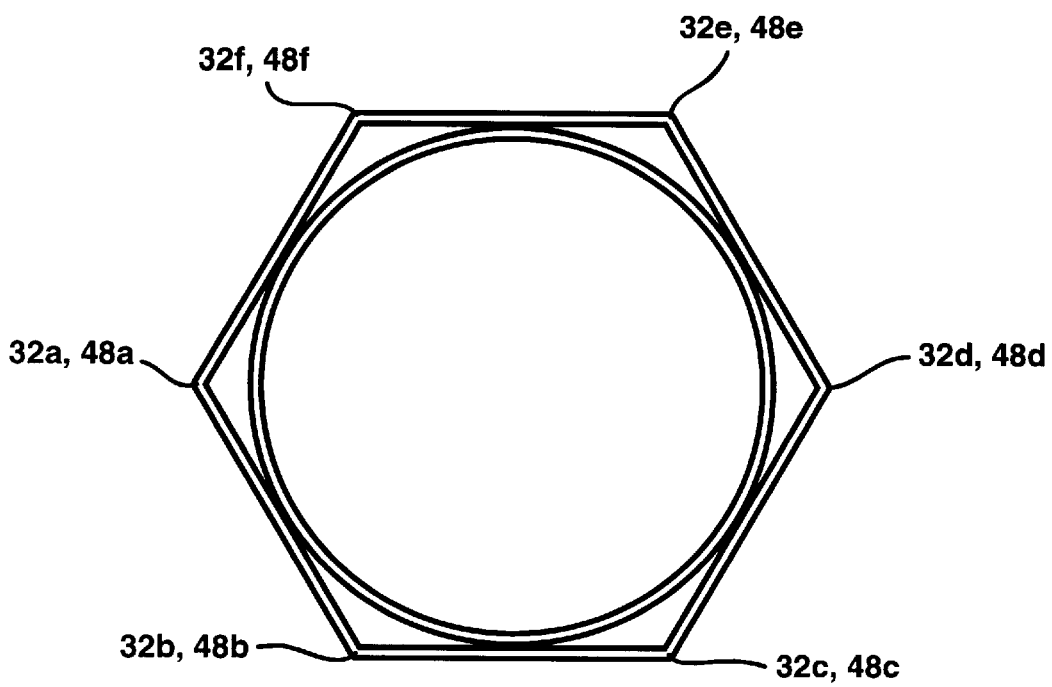
FIG. 6 is a top plan diagram illustrating the angular alignment of the float ring and weight ring when the drop net apparatus is in the conditions of FIGS. 1, 2, and 4.
Figure 7:
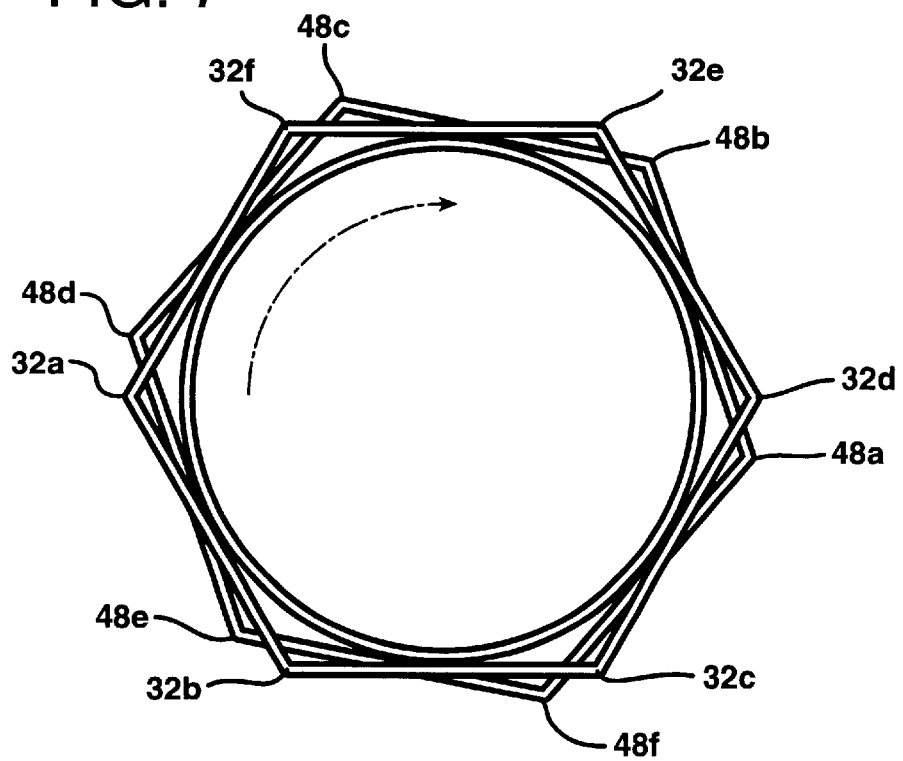
FIG. 7 is a top plan diagram illustrating the change in angular alignment of the float ring and weight ring when the drop net apparatus is in the condition shown in FIGS. 3 and 5.

The action of the torque lines 18, 19, and 20 in closing the net 16 is illustrated diagrammatically in FIGS. 4 and 5. As seen in those drawing figures, the torque lines 18, 19, and 20 initially have a spiral configuration about the outer outside cylindrical surface of the net 16 with the torque line anchor locations for each torque line initially lying at an angular offset of more than one hundred eighty degrees relative to the central, vertical axis 84 of the drop net 10. As tension is exerted upon the torque lines 18, 19, and 20 due to the increasing distance between the weight ring 14 and the float ring 12, the inextensible torque lines 18, 19, and 20 tug with a horizontal, tangential component of force in a clockwise direction to rotate the weight ring 14 in a clockwise manner relative to the float ring 12 located vertically thereabove. This rotation continues until the torque lines 18, 19, and 20 assume a straight, vertical orientation, as illustrated in FIGS. 3, 5, and 10.

While the length of the torque lines 18, 19, and 20 relative to the vertical height of the net 16 and relative to the torque anchor end distance of separation is the most important design consideration in order for the drop net 10 to function as required, there are other considerations as well. The float ring 12 must have sufficient buoyancy to counteract the weight of the weight ring 14 and the encompassing net 16. Also, it is highly desirable for the float ring 12 to have a reserve buoyancy of about one thousand pounds. That is, the float ring 12 should remain afloat even if an additional one thousand pounds of downward force is applied to it, in addition to the weight of the weight ring 14 and encompassing net 16. This reserve buoyancy is important since some fish can still become gilled in the net 16 and die. Because the weight of a fish in water is approximately fifteen percent of its weight in air, a reserve buoyancy of one thousand pounds means that the drop net 10 can support the weight of up to about seven thousand pounds of dead weight in the net 16. Such situations are undesirable, but can sometimes occur.

Once the drop net 10 is fully deployed in the water, the weight of the net 16 and weight ring 14 is supported from the float ring by the running lines 21–26, the net 16, and the torque lines 18, 19, and 20. The running lines 21–26 should be slackest of these load-bearing members, since the rotation of the weight ring 14 is dependent upon a sufficient amount of tension in the torque lines 18, 19, and 20. In fact, the running lines 21–26 don't really support the weight of the weight ring 14 to any significant extent, but merely serve to prevent the weight ring 14 from tipping too far from a horizontal disposition.

The running lines of the drop net of the invention are quite useful for controlling the vertical collapse of the net when it is to be lifted by a helicopter. Specifically, when the net is to be retrieved from a deployed condition in the sea, a helicopter hovering overhead hooks the lift ring with a suspended cable, and pulls the lift ring upwardly. This exerts tension on the running lines which causes the weight ring to counterrotate from its angularly offset alignment relative to the float ring, to a position of angular alignment therewith in which the running lines extend vertically upwardly from the weight ring through the eyes and grommets of the float ring. From there, the running lines converge upwardly toward the lift ring.

As further tension is exerted on the running lines, the weight ring is drawn upwardly toward the float ring as the running lines are lifted and slide through the grommets of the eyes on the float ring. As the weight ring is pulled upwardly, the net is folded with accordion-like folds until it is sandwiched beneath the weight ring below and the float ring above. At this point the tension on the running lines pulls the weight ring upwardly from the water, carrying with it the net and the float ring which are stacked atop the weight ring. The net may be carried suspended from the helicopter in this collapsed condition back to the parent fishing vessel from which the helicopter was originally deployed.

The length of the torque lines 18, 19, and 20 is extremely important. Preferably, the length of the torque lines 18, 19, and 20 is equal to about eighty-five percent of the maximum vertical distance of separation between the float ring 12 and the weight ring 14, which is the longitudinal length of the laterally enclosing net 16. Also, the length of the torque lines 18, 19, and 20 should be no less than about fifty percent of the length of the circumference of the float ring 12 and also the weight ring 14. If the length of the torque lines 18, 19, and 20 is too short, the weight ring 14 will rotate prematurely, thus creating a volume above the apex of closure 80 that is too close to the surface of the water 72. This will result in the point of closure 80 being at too shallow a level, in which case a significant number of the fish 79 will not be entrapped in the closed, upper portion 81 of the net 16.

A further design constraint is that the maximum stretched length that the net 16 would have in the absence of the torque lines 18, 19, and 20 should be greater than the diameter of the net 16. If the length of the net is less than its diameter, the closure apex 80 of the net will lie at too shallow a level beneath the surface of the water 72. In the case of the preferred embodiment of the invention described, the maximum length of the net 16 in the absence of the torque lines 18, 19, and 20 would be seventy-nine feet. Since the diameter of the net 16 is thirty-eight feet, the net 16 meets this design specification.

A further design specification is that the overall weight of the drop net assembly 10 must be light enough so that it can be transported suspended beneath a helicopter 70. Preferably, the drop net assembly 10 weighs no more than one thousand pounds. The preferred embodiment of the drop net assembly 10 described herein has a total weight of eight hundred eighty-six pounds. Consequently, it meets the weight limit specification and can be readily transported by either a McDonald Douglas Model MD500 helicopter or an MD-600N helicopter. These types of helicopters are currently utilized on large, commercial fishing vessels for spotting fish.

FIGS. 1, 4, 5, 11, and 12 best illustrate the practice of the method of the invention. As illustrated in FIG. 1, the drop net 10 is initially vertically collapsed so that the upper float ring 12 and the lower weight ring 14 are brought together, thereby folding the net 16 therebetween. The weight ring 14 and float ring 12 are temporarily secured together utilizing the sacrificial ties 68. The ties 68 hold the drop net 10 in the collapsed condition illustrated in FIG. 1.

An MD-500 helicopter takes off from its landing pad on a fishing vessel and lowers a suspended hook 85. The hook 85 suspended from the helicopter 70 is used to lift and suspend the drop net 10 in the air by the lift ring 28. Deck personnel aboard the fishing vessel engage the hook 85 in the lift ring 28 when the twist closure drop fishing net 10 is in the condition illustrated in FIG. 1. The helicopter 70 then ascends, carrying the drop net 10 with it, above the surface of the water 72 as illustrated in FIG. 11. The helicopter 70 is then flown to a site containing a concentration of fish near the surface of the body of water 72.

The hook 85 preferably has a release mechanism that allows the lift ring 28 to be released by personnel within the helicopter 70. Once the helicopter 70 arrives above a school of fish 79, it descends vertically downwardly until the drop net 10 reaches the surface of the water 72. The release mechanism for the hook 85 is actuated, thereby releasing the lift ring 28. This removes all tension from the running lines 21–26. The weight ring 14 thereupon breaks the temporary ties 68 and drops from the float ring 12 due to the force of gravity. As the weight ring 14 drops, as illustrated in FIG. 4, the running lines 21–26 travel freely through the grommets 44 in the float ring 12. The weight ring 14 sinks beneath the surface 72 of the body of water while the float ring 12 floats thereabove. This extends the net 16 vertically downwardly, as illustrated in FIG. 4. As the weight ring 14 begins to exert tension upon the torque lines 18, 19, and 20, the torque lines exert tangential, clockwise forces on the weight ring 14 causing it to rotate relative to the float ring 12, as illustrated in FIG. 5. The rotating weight ring 14 twists the lower portion of the net 16 shut as the torque lines 18, 19, and 20 arrive at straight, vertical alignment extending downwardly from the float ring 12.

As the drop net 10 assumes the configuration depicted in FIGS. 3 and 5, the fish 79 are captured in the upper portion 81 of the net 16. The drop net 10 thus, in effect, creates a floating aquarium in which the fish 79 swim until the arrival of the fishing vessel. The fish 79 are then harvested from the upper portion 81 of the drop net 10 utilizing a special chute that allows unwanted and protected species to be returned live to the sea or separated for aquarium use or for any other special purpose. The target species of fish 79 are removed from the upper portion of the net 16 for commercial consumption.

Figure 12:
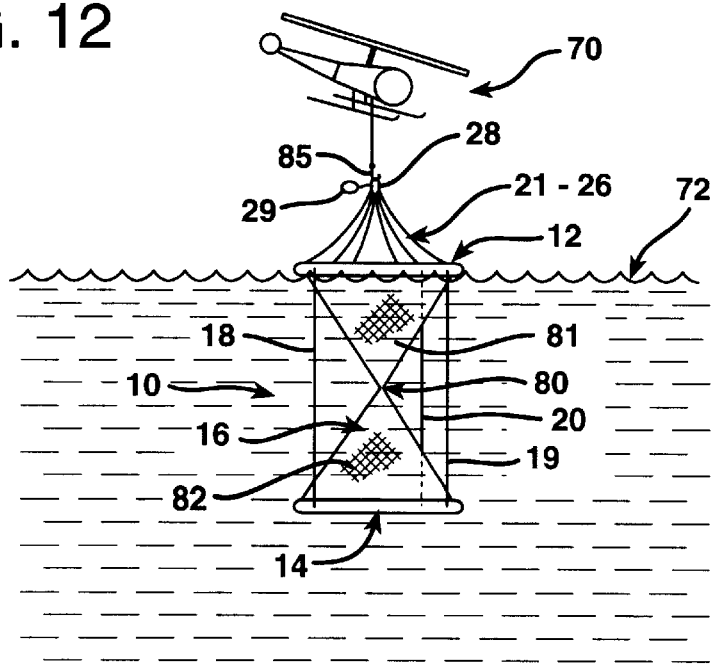
FIG. 12 is a side elevational diagram illustrating a helicopter pick up of the drop net in its fully deployed condition of FIG. 3.

Once the upper portion of the net 16 has been emptied, it can be retrieved from the sea utilizing the helicopter 70 as illustrated in FIG. 12. The hook 85 is lowered from the helicopter 70 and the buoyant lift ring 28 is snagged from the surface of the sea 72, where it is held by the float 29. The helicopter 70 then lifts the lift ring 28 from the surface of the body of water 72, thereby exerting tension on the running lines 21–26 throughout their lengths. This tension on the running lines 21–26 counterrotates the weight ring 14 from its orientation as illustrated in FIGS. 3 and 5 to an orientation shown in FIGS. 2 and 4. The weight ring 14 is counterrotated relative to the float ring 12. Continued ascension of the helicopter 70 pulls the running lines 21–26 up through the grommets 44 in the float ring 12 thereby drawing the weight ring 14 up to the float ring 12 while vertically collapsing the net 16 therebetween. The drop net 10 can then be lifted from the surface of the water 72 and returned to the fishing vessel in the manner illustrated in FIG. 11.

Undoubtedly, numerous variations and modifications of the invention will become readily apparent to those familiar with commercial fishing operations.

Accordingly, the scope of the invention should not be construed as limited to the specific embodiment and implementation of the method described herein.

I claim:

1. An apparatus for entrapping fish comprising:

an upper hoop that floats on the surface of a body of water and which defines a closed buoyant ring having a circumferential length and a fixed circumferential shape, a lower hoop that sinks in the water and which defines a closed, weighted ring having a circumferential length and a fixed circumferential shape, a laterally enclosing net having an upper end with a closed circumference, a lower end with a closed circumference and a longitudinal length equal to the distance between said net ends when they are drawn a maximum distance apart, and said upper end of said net is secured about its circumference to said upper hoop throughout its circumference and said lower end of said net is secured about its circumference to said lower hoop throughout its circumference, and a plurality of torque lines, each having opposing upper and lower ends, and said upper and lower ends of each of said torque lines are secured at fixed, angularly offset locations to said upper and lower hoops, respectively, and said torque lines have a linear length less than said longitudinal length of said laterally enclosing net, whereby said torque lines rotate said lower hoop and twist the lower portion of said net shut when said lower hoop descends from said upper hoop in said body of water.

2. An apparatus according to claim 1 wherein said lower end of each of said torque lines is secured to said lower ring at a location angularly offset at least one hundred eighty degrees from the location at which said upper end is secured to said upper hoop prior to rotation of said lower hoop relative to said upper hoop.

3. An apparatus according to claim 2 further comprising at least three of said torque lines.

4. An apparatus according to claim 2 wherein each of said torque lines is between about seventy-five percent and about ninety-five percent of said longitudinal length of said laterally enclosing net.

5. An apparatus according to claim 2 wherein the length of each of said torque lines is at least equal to about one-half of said circumferential length of said upper hoop.

6. An apparatus according to claim 2 wherein said longitudinal length of said net is at least as great as about ninety percent of said circumferential length of said upper hoop.

7. An apparatus according to claim 2 wherein said upper and lower hoops have the same circumferential shape and the same circumferential length.

8. An apparatus according to claim 7 wherein said upper and lower hoops both have the same polygonal shape.

9. An apparatus according to claim 2 wherein said upper and lower hoops, said net, and said torque lines weigh no more than about 1000 pounds.

10. An apparatus according to claim 9 further characterized in that said upper hoop and said net together have a reserve buoyancy of at least about 1,000 pounds.

11. An apparatus according to claim 2 wherein said net is formed of a material having a specific gravity of between about 0.9 and about 1.4.

12. An apparatus according to claim 1 further comprising a lift ring, a plurality of grommets on said upper hoop located at spaced locations along said circumferential length thereof, and a plurality of running lines, and each of said running lines has a lower end that is secured to a fixed running line anchoring location on said lower hoop and passes through grommets at a separate one of said spaced locations on said upper hoop that is vertically aligned with said fixed running line anchoring location on said lower hoop when said upper and lower ends of said torque lines reside at angularly offset locations as aforesaid, and each running line has an upper end that is secured to said lift ring.

13. An apparatus according to claim 12 further comprising stops on said running line positioned between said grommets on said upper hoop and said lifting ring such that the lengths of those portions of each of said running lines between said grommets on said upper hoop and said fixed running line anchoring location on said lower hoop is at least as great as said linear length of said torque lines.

14. An apparatus for trapping fish in water comprising:

a float ring that is buoyed to float upon the surface of water, a weight ring that sinks when dropped in water, a net having a mesh size small enough to prevent the passage therethrough of fish of a predetermined size, said net having an upper end secured to said float ring throughout its circumference and a lower end secured to said weight ring throughout its circumference, and a predetermined length that is a design depth vertical distance of separation in water between said float ring and said weight ring, and a plurality of torque lines having opposite ends anchored to said float ring and to said weight ring at locations thereon angularly offset from each other, whereby said anchored ends of each of said torque lines lie at a torque anchor end spiral distance of separation as measured on the outside surface of said net that is greater than said design depth vertical distance of separation between said float ring and said weight ring, and the length of said torque lines is less than said torque anchor end spiral distance of separation, whereby said torque lines cause said weight ring to rotate relative to said float ring as said weight ring travels toward said design depth vertical distance of separation between said float ring and said weight ring, thereby twisting and closing the lower portion of said net.

15. An apparatus according to claim 14 wherein said anchored ends of each torque line are secured to locations on said rings angularly offset at least one hundred eighty degrees and said lengths of said torque lines is equal to between about seventy-five percent and about ninety-five percent of said maximum vertical distance of separation between said float ring and said weight ring.

16. As apparatus according to claim 15 wherein said length of said torque lines is about equal to about ninety percent of said maximum vertical distance of separation between said float ring and said weight ring and is no less than about one-half of the length of the circumference of said float ring.

17. An apparatus according to claim 16 further comprising eyes on said float ring located at intervals about the circumferential length of said float ring and a lift ring located within the circumference of said float ring, and further comprising a plurality of running lines each of which is secured to said lift ring and extends through a separate one of said eyes on said float ring and is attached to said weight ring at a location thereon that is vertically aligned with said one of said eyes prior to descent of said weight ring from said float ring.

18. A method of entrapping fish in a body of water utilizing a confining apparatus having a buoyant upper hoop of fixed shape, a weighted lower hoop of fixed shape, a laterally encompassing net having an upper end secured to said upper hoop throughout its circumference and a lower end secured to said lower hoop throughout its circumference and a plurality of torque lines each having opposing ends connected to said upper and lower hoops at fixed angularly offset locations thereon comprising:

releasing said confining apparatus from the air onto a body of water above a school of fish, whereby said weighted hoop sinks beneath the surface of said body of water to thereby extend said net while said buoyant hoop floats thereabove, and causing said lower hoop to rotate relative to said upper hoop, thereby twisting the lower portion of said net shut.

19. A method according to claim 18 wherein said upper hoop is equipped with grommets fixed at intervals above its circumference and a lift ring located within said upper hoop, a plurality of running lines attached to said lower hoop laced through said grommets on said upper hoop and attached to said lift ring further comprising lifting said lifting ring from above said body of water, thereby exerting tension on said running lines throughout their lengths which counterrotates said lower hoop relative to said upper hoop and draws said lower hoop up to said upper hoop while vertically collapsing said net therebetween.

20. A method according to claim 19 utilizing sacrificial ties and further comprising initially vertically collapsing said upper and lower hoops together, thereby folding said net therebetween, and temporarily securing said hoops together utilizing said sacrificial ties, thereby holding said confining apparatus in a collapsed condition, lifting and suspending said confining apparatus in the air by said lifting ring utilizing a helicopter, and flying said helicopter to a site containing a concentration of fish near the surface in said body of water, before releasing said confining apparatus as aforesaid.

\* \* \* \* \*